Jan. 5, 1937. D. A. BRENNAN Re. 20,233

FASTENER

Original Filed March 3, 1930

Inventor.

Daniel A. Brennan

Reissued Jan. 5, 1937

Re. 20,233

UNITED STATES PATENT OFFICE 20,233

FASTENER

Daniel A. Brennan, Chicago, Ill.

Original No. 2,043,462, dated June 9, 1936, Serial No. 432,800, March 3, 1930. Application for reissue October 26, 1936, Serial No. 107,730

51 Claims. (Cl. 24—153)

The invention relates broadly to improvements in fasteners and particularly fasteners for binding loose papers together, such as letters in a file, and more particularly to a new and improved fastener including a base having spaced prongs at its ends adapted to be held down against the papers by a compressor.

An object of the invention is to provide an improved fastener which is simpler in construction, more efficient in use, and easier to manipulate than prior structures.

Another object is to provide a fastener of the class referred to with a novel compressor adapted to effect self-adjustment of the prongs into binding engagement therewith.

Other objects will become more apparent upon a perusal of the specification and claims, taken together with the accompanying drawing, in which:

Figure 1:
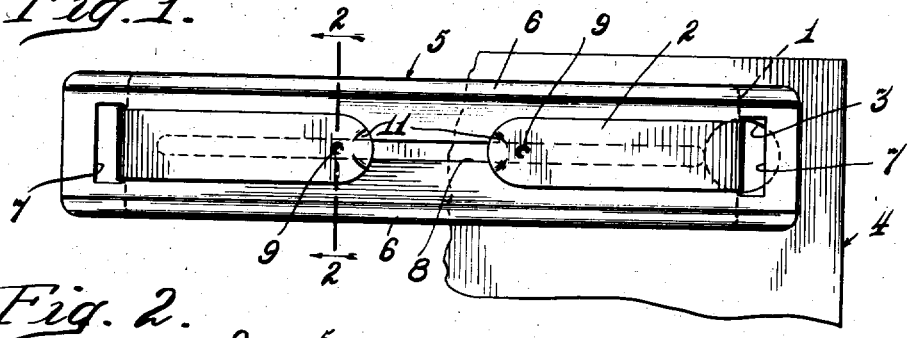
Fig. 1 is a plan view of one form of the improved fastener.
Figure 2:
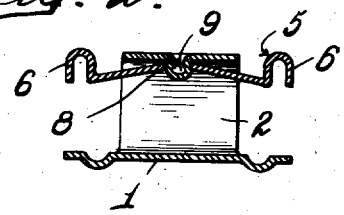
Fig. 2 is a transverse sectional view taken on line 2—2 of Fig. 1.

Referring particularly to Figs. 1 and 2 of the drawing, the fastener constituting one embodiment of the invention, comprises a base 1, provided at its ends with spaced prongs 2 adapted to pass through similarly spaced apertures 3 in the file papers 4.

The compressor 5 is formed of relatively stiff material such as for example, steel or brass and preferably is formed with longitudinal marginal reinforcing ribs or beads 6. Apertures 7 are provided one adjacent each end of the compressor to receive the prongs 2, one in each aperture, after which they are bent downwardly against the compressor.

A longitudinal slot 8 is formed in the compressor terminating inwardly of apertures 7, although it may extend into the apertures 7, to receive projections 9 preferably formed by providing detents at the ends of the prongs. The ends of the prongs preferably are formed concavo-convexo, as at 11, to facilitate access thereto to disengage the projections 9 from the slot 8.

It will be noted that the intermediate portion of the compressor, between ribs or beads 6 preferably is inclined transversely upwardly toward the slot 8 to increase the resiliency of the elevated portion of the compressor for receiving and retaining the projections 9 in the slot.

Figure 3:
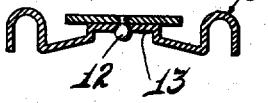
Fig. 3 is a transverse sectional view of a form of fastener similar to that shown in Fig. 1.

Fig. 3 shows a transverse sectional view of the form of compressor shown in Figs. 1 and 2, differing from that form in being provided with rivets 12 at the ends of the prongs and a slotted elevated central portion 13 in the compressor 5.

Figure 4:
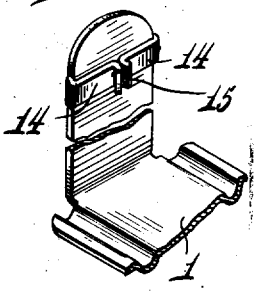
Fig. 4 is a fragmental view of the base of a fastener showing a modified form of projection on the prong.

The projection on the prong, shown in Fig. 4, is formed by bending lateral extensions 14 on each prong inwardly and then outwardly to provide a detent 15. The extension may be spaced one at each side of the prong to yieldingly engage the two edges of the slot 8.

Figure 5:
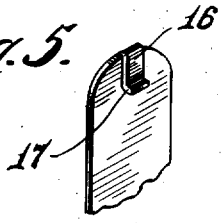
Fig. 5 is a perspective view showing another form of detent for the prong.

The modified form of prong shown in Fig. 5 is similar to that shown in Fig. 4 but has a strip 16 bent back against the end of the prong to form a detent 17. In this form, with the prong bent flat against a compressor and the detent engaged in the slot therein, a space is maintained by said fold between said prong and compressor at both sides of said detent to provide for access thereto to separate the detent from the compressor.

Figure 6:
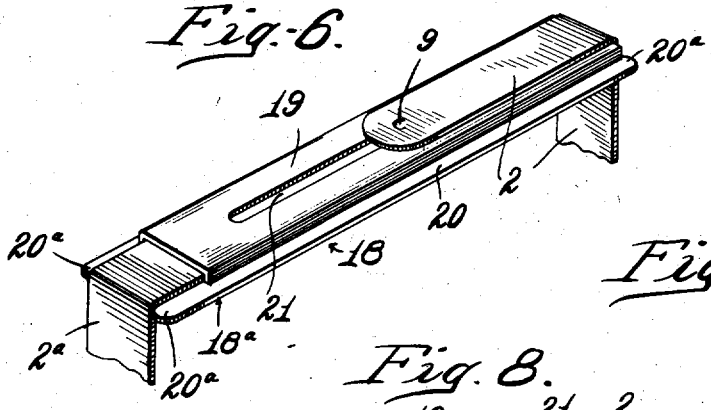
Fig. 6 is a perspective view of a modified form of fastener.
Figure 8:
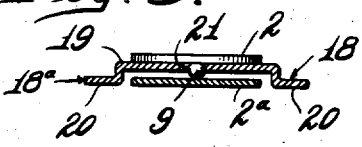
Fig. 8 is a transverse sectional view taken on line 8—8 of Fig. 7.
Figure 7:
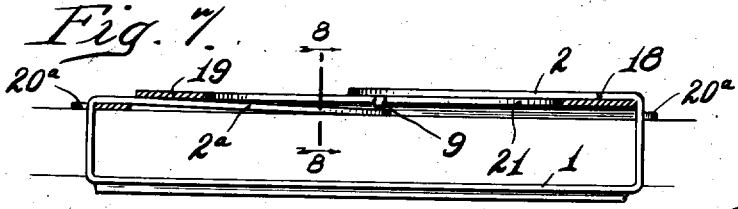
Fig. 7 is a longitudinal sectional view of the fastener shown in Fig. 6.

The embodiment illustrated in Figs. 6, 7 and 8 differs from the forms previously described in that one prong $2^a$ is arranged to lie beneath a portion of the compressor and the other prong 2 over against the top of it. As shown, the compressor 18 is formed from an elongated flat plate $18^a$ and has a longitudinally slotted central elevated portion 19 preferably open at both ends and terminating short of one end of said compressor. The sidewalls of said elevated portion preferably are closely adjacent the longitudinal offset margins or edges 20 of the compressor to reinforce said edges. In assembly, one prong $2^a$ is inserted over the top of the extended forked end of the compressor between the projections $20^a$ through one open end of said elevated portion to lie beneath said elevated portion, and the other prong 2 is bent over the other forked end between the projections $20^a$ against the top of said elevated portion. A detent projection 9, provided on the end of prong 2, engages in the longitudinal slot 21 in said elevated portion to hold said prong against the compressor.

With this construction a base having longer prongs than standard may be used thus avoiding the necessity of changing bases as the file increases in thickness, and at least one prong is held out of contact with the file.

It can be readily understood that the fasteners shown in various embodiments in the accompanying drawing and described in detail in the specification, effect a tight clamping of the papers in the file.

I claim:

1. A fastener having, in combination, a compressor, a base provided with spaced prongs, one of said prongs being adapted to extend through an opening in said compressor and then be held bent over substantially parallel to the plane of said compressor, a projection on the other prong, and means in the compressor adapted to engage said projection to hold said prong in bent over position against said compressor.

2. A fastener having in combination, a base provided with spaced prongs extending at right angles thereto, a projection on at least one of said prongs, a compressor to co-operate with said base, and means in said compressor adapted to be engaged by said projection when the prongs are bent over parallel to the plane of the compressor.

3. A fastener having, in combination, a base provided with spaced prongs, and a compressor having a slot to engage means on said prongs to hold them flat against the compressor.

4. A fastener having, in combination, a base provided with spaced prongs, a projection on one of said prongs, and a compressor having a slot to engage said projection to hold said prong flat against the compressor.

5. A fastener having, in combination, a base provided with spaced prongs, a compressor having spaced longitudinal ribs, and a lock associated with at least one prong adapted to interlock with said compressor between said ribs.

6. A fastener having, in combination, a compressor, a base comprising an elongated member having a prong at each end, and a projection formed adjacent the end of each prong adapted to engage in an opening in said compressor to hold the prongs to the compressor.

7. A fastener comprising, in combination, an elongated compressor having spaced apertures, one in each end, a flat elongated base having spaced prongs, one on each end, said prongs being adapted to be inserted through said apertures and then bent inwardly toward each other against the compressor, a longitudinal slotted elevated portion in said compressor, and a projection on each of said prongs adapted to engage said slot to detachably hold said prongs against said compressor.

8. A fastener comprising, in combination, an elongated compressor having spaced apertures, one in each end, a flat elongated base having spaced prongs, one on each end, said prongs being adapted to be inserted through said apertures and then bent inwardly toward each other against the compressor, a longitudinal slot in said compressor, and a projection formed on each of said prongs adapted to engage said slot to hold said prongs against said compressor.

9. A fastener comprising, in combination, an elongated compressor having spaced apertures, one in each end; a flat elongated base having spaced prongs, one on each end; said prongs being adapted to be inserted through said apertures and then bent inwardly toward each other against the compressor; said compressor having a longitudinal slot therein; and yieldable means on each of said prongs engaging in said slot to hold said prongs against said compressor.

10. A fastener comprising, in combination, a base provided with spaced prongs and a compressor having reinforced edges and similarly spaced apertures, said prongs being adapted to be inserted through said apertures and bent toward each other against the compressor, and means on the prongs co-operating with a slot in said compressor to hold said prongs against the compressor.

11. A fastener comprising, in combination, a base provided with spaced prongs and a compressor having similarly spaced apertures, said prongs being adapted to be inserted through said apertures and bent toward each other against the compressor, and a projection on said prongs engaging in a slot in said compressor to hold said prongs against the compressor.

12. A fastener comprising, in combination, a flat elongated base having angularly disposed prongs, one on each end, and an elongated compressor having spaced apertures, one in each end, adapted to receive said prongs; said prongs being adapted to be bent down over said compressor; and said compressor having a longitudinal slot terminating inwardly of said apertures to receive retaining means on said prongs to hold said prongs against the compressor.

13. A fastener comprising, in combination, a base provided with spaced prongs and a compressor having similarly spaced apertures, said prongs being adapted to be inserted through said apertures and then bent toward each other against the compressor, said compressor having a longitudinal slot terminating inwardly of the apertures, and means adjacent the free end of each of said prongs co-operating with said slot to hold said prongs against the compressor.

14. A fastener comprising, in combination, an elongated compressor having spaced apertures, one in each end; a flat elongated base having spaced prongs, one on each end; said prongs being adapted to be inserted through said apertures and then bent inwardly toward each other against the compressor; a longitudinal slotted yieldable elevated portion in said keeper, and means adjacent the free end of each of said prongs adapted to engage in said slot to hold detachably said prongs against the compressor.

15. A fastener comprising, in combination, an elongated compressor having spaced apertures, one in each end; a flat elongated base having spaced prongs, one on each end; said prongs being adapted to be inserted through said apertures and then bent inwardly toward each other against the compressor, and a longitudinal slotted yieldable elevated portion in said compressor, said slotted elevated portion yieldably engaging means on said prongs to hold said prongs against the compressor.

16. A fastener comprising, in combination, an elongated compressor having spaced apertures, one in each end, a flat elongated base having spaced prongs, one on each end, said prongs being adapted to be inserted through said apertures and then bent inwardly toward each other against the compressor, a projection on the free end of each of said prongs, and a longitudinal slotted elevated portion in said compressor adapted to co-operate with said projections to hold said prongs against said compressor.

17. A fastener comprising, in combination, an elongated compressor having reinforced longitudinal edges and spaced apertures, one in each end; a base having spaced prongs, one on each end, adapted to be inserted through said apertures and then bent inwardly over said compressor between said reinforced edges; the compressor between said reinforced edges being elevated and slotted longitudinally; said slot terminating inwardly of said apertures, and means on the prongs adapted to engage in said slot to hold said prongs against the compressor.

18. A fastener comprising, in combination, an elongated compressor having reinforced longitudinal edges and longitudinally spaced apertures, one in each end; a base having spaced prongs, one on each end, adapted to be inserted through said apertures and then bent inwardly over said compressor between said reinforced edges; and a projection on the free end of each of said prongs adapted to be engaged by yieldable means in said compressor to hold said prongs against the compressor.

19. A fastener comprising, in combination, an elongated compressor having spaced apertures, one in each end; a flat elongated base having spaced prongs, one on each end; said prongs being adapted to be inserted through said apertures and then bent inwardly toward each other against the compressor, said compressor having a longitudinal slot therein; means on each of said prongs adapted to engage in said slot to hold said prongs against the compressor, and means on the end of each of said prongs to facilitate their disengagement from the compressor.

20. A fastener comprising, in combination, an elongated compressor having spaced apertures, one in each end; a flat elongated base having spaced prongs, one on each end; said prongs being adapted to be inserted through said apertures and then bent inwardly toward each other over the compressor; said compressor having a longitudinal slot therein; and a detent formed adjacent the free end of each of said prongs adapted to be retained yieldably in said slot to bind the prongs against the compressor.

21. A compressor, for a fastener including a base having spaced prongs, said compressor having an aperture adjacent each end and being elevated longitudinally between said apertures, said elevated portion having means to receive and retain projections on said prongs, when the latter are inserted through said apertures, to hold said prongs against the compressor in bent down position.

22. A compressor, for a fastener including a base having spaced prongs, said compressor having an aperture adjacent each end to receive said prongs, and continuous means extending between said apertures to receive a projection on said prongs to hold the prongs against the compressor in bent down position.

23. A fastener comprising, in combination, an elongated compressor having spaced apertures, one in each end; a base having spaced prongs, said prongs being adapted to be inserted through said apertures and then bent inwardly toward each other over the compressor, said compressor having a longitudinal slot therein, and inwardly downwardly turned lateral extensions adjacent the free end of each of said prongs adapted to be retained yieldably in said slot to bind the prongs against the compressor.

24. In a fastener, a base comprising an elongated member having a prong at each end, extensions adjacent the free end of each prong, said extensions being folded over against the respective prong and bent to provide a projection on one face thereof.

25. In a fastener, a base comprising, an elongated member having a prong extending from each end, and an extension on each prong folded to provide a projection on one face thereof.

26. A fastener having, in combination, a compressor, a base comprising, an elongated member having prongs extending at right angles therefrom, one at each end, and means at the end of each prong folded to form a projection on one face thereof adapted to engage said compressor to hold said prong to the compressor.

27. A fastener comprising, in combination, an elongated compressor having a longitudinal slotted elevated portion terminating short of one end, said elevated portion being open at its ends, a base having spaced prongs one on each end, one of said prongs being adapted to be bent over the end of the compressor and inserted through the adjacent open end beneath said elevated portion, the other prong being bent over against the top of said elevated portion, and means on said last named prong adapted to enegage in said slot to bind the prong against the compressor.

28. A fastener comprising, in combination, an elongated compressor having a longitudinal elevated portion terminating short of one end, said elevated portion being open at its ends, a base having spaced prongs one on each end, one of said prongs being adapted to be inserted beneath said elevated portion over the adjacent end of said compressor, the other prong being adapted to be bent over the top of said elevated portion, and means on the last named prong adapted to engage means in said elevated portion to bind the prong against the compressor.

29. A fastener comprising, in combination, an elongated compressor having a transverse opening in a plane substantially at right angles to the plane of and adjacent one end of the compressor, a base having spaced prongs one on each end, one of said prongs being adapted to be inserted through said opening over the adjacent end of said compressor, the other prong being adapted to be bent over against the top of said compressor, and means on said last named prong adapted to engage said compressor to bind the prong against the compressor.

30. A fastener comprising, in combination, an elongated compressor having a transverse opening disposed in a plane substantially at right angles to the plane of and adjacent one end of the compressor, a base having spaced prongs, one on each end, one of said prongs being adapted to be inserted through said opening over the adjacent end of said compressor, the other prong being adapted to be bent over against the top of said compressor, a projection on said prong, and means in the compressor adapted to co-operate with said projection to bind said prong to the compressor.

31. A fastener comprising, in combination, an elongated compressor having a transverse opening extending in a plane substantially at right angles to the plane of and adjacent one end of the compressor, a base having spaced prongs, one on each end, one of said prongs being adapted to be inserted over one end of the compressor and through said opening, the other prong being adapted to be bent over against the compressor, and means retaining said last named prong against said compressor.

32. In a fastener, a compressor comprising, a flat elongated member formed with reinforced longitudinal edges, a transverse shoulder at one end having an opening, and a central longitudinal elevated portion.

33. In a fastener, a compressor comprising, a flat elongated member formed with reinforced longitudinal edges, a transverse shoulder at one end having an opening, and a central slotted longitudinal elevated portion.

34. A fastener having, in combination, a base provided with spaced prongs, and a compressor comprising a flat elongated member having a central longitudinal elevated portion terminating short of and opening toward one end, said elevated portion having means to engage one of said prongs to hold it flat against the compressor.

35. A paper fastener compressor as described comprising, an elongated plate, means at one end forming a prong receiving receptacle, and a slot extending longitudinally inwardly from the other end of said plate.

36. A fastener having, in combination, a base provided with spaced prongs, and a compressor having a receptacle at one end to receive one of said prongs, a projection on the other prong, and a slot in the compressor to engage said projection to hold said prong flat against said compressor.

37. A fastener having, in combination, a base provided with spaced prongs, a compressor formed at its ends to embrace said prongs, a receptacle at one end of said compressor to receive one of said prongs, a projection on the other prong, and a slot in the compressor to engage said projection to hold said prong flat against said compressor.

38. A compressor, for a fastener including a base provided with spaced prongs, having forked ends, to embrace said prongs, a prong receiving receptacle at one end of said compressor, and a slot extending longitudinally inwardly from the other end.

39. A fastener having, in combination, a base provided with spaced prongs, a compressor adapted to have said prongs bent over its ends down against its top, said compressor being forked at least at one end to prevent lateral movement thereof relative to the associated prong, and means to secure said prongs to the compressor.

40. A fastener having, in combination, a base provided with spaced prongs, a compressor, said prongs being adapted to be bent down over the ends of said compressor against its top, means to secure said prongs to the compressor, and a projection on at least one end of said compressor adapted to co-operate with the associated prong to prevent lateral shifting of said compressor.

41. A fastener comprising, in combination, an elongated base having prongs, one at each end, a compressor formed from a flat plate, projections on each end of said plate, said prongs being adapted to extend between said projections and be bent inwardly toward each other, and means on the compressor to hold said prongs in bent position.

42. A fastener comprising, in combination, an elongated base having prongs, one at each end, a compressor formed from a flat plate, a pair of laterally spaced apart longitudinal projections on each end of said plate, said prongs being adapted to extend between the respective pair of projections and be bent inwardly toward each other, and means to hold said prongs in bent position.

43. A fastener comprising, in combination, an elongated base having prongs, one at each end, a compressor formed from a substantially flat plate having its longitudinal margins offset, projections on each end of said plate, said prongs being adapted to extend between said projections and be bent inwardly toward each other, and means on the compressor to hold said prongs in bent position.

44. A fastener comprising, in combination, an elongated base having prongs, one at each end, a compressor formed from a substantially flat plate having its longitudinal margins offset, projections on each end of said plate, said prongs being adapted to extend between said projections and be bent inwardly toward each other, and means to hold said prongs in bent position.

45. A fastener comprising a base having spaced prongs and a compressor having flanges at its longitudinal edges providing a fork at each end of a width to receive the prongs and a longitudinal elevated portion on the compressor, said elevated portion including means to hold said prongs bent down inwardly toward each other over the forked ends of the compressor.

46. A compressor, for a fastener including a base provided with spaced prongs, comprising a substantially flat plate having forked ends to embrace said prongs, and means on the compressor adapted to hold said prongs bent down inwardly toward each other.

47. A fastener compressor comprising an elongated substantially flat plate, longitudinal flanges formed on the edges of said plate, said flanges extending longitudinally beyond the ends of the intermediate plate portion to provide a recess on each end of said plate.

48. A fastener having, in combination, a base provided with spaced prongs, a compressor adapted to have said prongs bent down over its ends inwardly towards each other, said compressor being formed from a flat plate forked at least at one end to prevent lateral movement thereof relative to the associated prong, and means to secure said prongs in bent down position.

49. A fastener comprising, in combination, a base provided with spaced prongs, a rigid compressor formed from a flat plate, a recess in each end of said compressor, each adapted to receive and embrace one of said prongs, said prongs being adapted to be bent down against the compressor, and means on the compressor to hold said prongs in bent position.

50. A paper fastener comprising, in combination, a base having spaced prongs, and a compressor formed from a flat plate having similarly spaced ends, laterally spaced projections extending from at least one of said ends forming a transversely elongated recess, one of said prongs being adapted to extend between said projections and be bent down over said compressor, means on said compressor to retain said prong in bent position, and means to hold the other prong against the compressor.

51. A fastener comprising, in combination, an elongated compressor, at least one end of said compressor being forked, a base having spaced prongs, one of said prongs being adapted to be bent over one forked end down against the top of said compressor, a projection adjacent the end of said prong, and means on said compressor adapted to co-operate with said projection to hold the prong in bent position.

DANIEL A. BRENNAN.